No. 658,193. Patented Sept. 18, 1900.
C. S. TALBERT.
ARTIFICIAL TOOTH.
(Application filed Feb. 9, 1900.)
(No Model.)
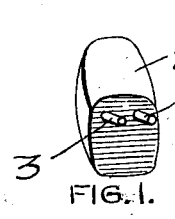
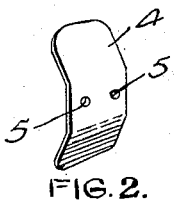
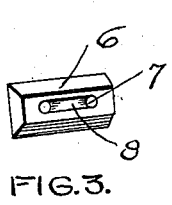
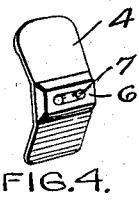
FIG. 1. FIG. 2. FIG. 3. FIG. 4.
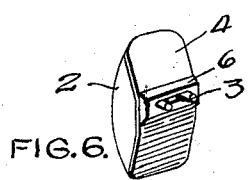
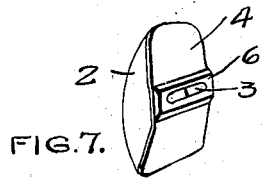
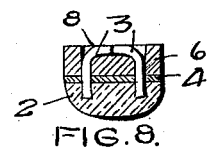
FIG. 6. FIG. 7. FIG. 8.
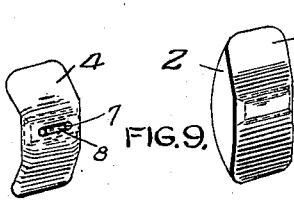
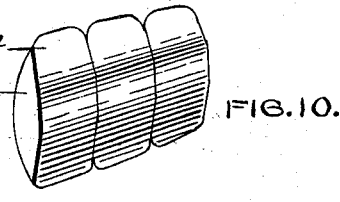
FIG. 5. FIG. 9. FIG. 10.
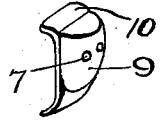
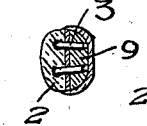
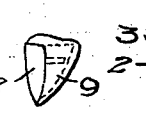
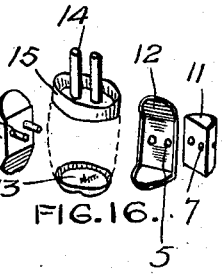
FIG. 11. FIG. 12. FIG. 13. FIG. 14. FIG. 16.
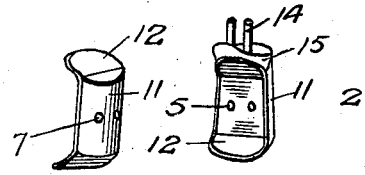
FIG. 15. FIG. 17. FIG. 18. FIG. 19.
FIG. 20.
WITNESSES
E. G. Staude
Richard Paul
INVENTOR
CHARLES S. TALBERT.
BY Paul & Hawley
HIS ATTORNEYS
THE NORRIS PETERS CO., PHOTO-LITHO., WASHINGTON, D. C.

UNITED STATES PATENT OFFICE.

CHARLES S. TALBERT, OF MINNEAPOLIS, MINNESOTA.

ARTIFICIAL TOOTH.

SPECIFICATION forming part of Letters Patent No. 658,193, dated September 18, 1900.

Application filed February 9, 1900. Serial No. 4,597. (No model.)

*To all whom it may concern:*

Be it known that I, CHARLES S. TALBERT, of the city of Minneapolis, county of Hennepin, State of Minnesota, have invented certain new and useful Improvements in Artificial Teeth, of which the following is a specification.

The invention relates to artificial teeth.

The primary object of the invention is to provide means for securing the porcelain veneer or facing of an artificial tooth to the backing-plate without the use of solder, thus removing all danger of checking or otherwise injuring the facing by the heat of a soldering-flame.

A further object is to provide means for securing the facing and backing-plate together, whereby a fluid-tight joint will be formed between the front and back portions of the tooth and the parts held together as rigidly as though formed in a single piece.

A further object is to provide an anchoring device on the back of the plate for the tooth-facing, by the use of which a considerable saving in gold solder is effected.

The invention consists generally in various constructions and combinations, all as hereinafter described, and particularly pointed out in the claims.

In the accompanying drawings, forming part of this specification, Figure 1 is a perspective of a porcelain facing used in constructing artificial teeth. Fig. 2 is a similar view of the backing-plate therefor. Fig. 3 is a perspective of the anchoring-block or auxiliary backing. Fig. 4 is a similar view of the backing-plate with the block secured thereon. Fig. 5 is a view of the backing-plate and block, showing the sharp edges of a block concealed by gold solder. Fig. 6 is a view of the backing-plate and block, showing the facing fitted thereon and before soldering it. Fig. 7 is a view showing the ends of the pins clenched in the anchoring-block. Fig. 8 is a sectional view of the same. Fig. 9 is a perspective of a completed tooth or dummy. Fig. 10 is a perspective showing a series of teeth united to form a bridge. Fig. 11 is a view of an anchoring-block for a bicuspid or molar tooth. Fig. 12 is a view of a bicuspid backing-plate and block secured thereon. Fig. 13 is a sectional view showing the facing secured to the backing-plate of a bicuspid. Fig. 14 is a view of a dummy for a bicuspid tooth. Fig. 15 is a view of a molar dummy, showing the outline of the anchoring-block. Fig. 16 shows the parts which when put together form a Richmond crown. Fig. 17 is a perspective of a Richmond-crown backing-plate and block thereon. Fig. 18 is a similar view showing the anchoring-post and the box for the facing. Fig. 19 is a view of a completed Richmond crown. Fig. 20 is a sectional view showing the method of anchoring the facing-pins in the backing-plate.

In the drawings, 2 represents a porcelain veneer or facing in common use among dentists and provided with anchoring pins or posts 3, baked in the porcelain.

4 is a thin metal backing-plate that is burnished to fit the facing and is provided with holes 5 to receive the pins 3. The plate 4 is preferably quite thin, and the pins are usually secured in the holes 5 by embedding their inner ends in a suitable solder. This process has been found objectionable, as the heat of the soldering-flame frequently checked or otherwise injured the porcelain facing and rendered it less durable. A thicker backing-plate was also found to be objectionable, as it was more difficult to fit to the porcelain facing and was more expensive than the thin plate. To obviate these difficulties, I provide a block 6, of German silver or other suitable material, having holes 7, adapted to register with the holes 5 in the backing-plate and connected by a groove 8. After the backing-plate 4 is burnished to fit the facing the block 6 is fitted over the holes therein and soldered thereon before the facing is put in place, so that all injury to the facing from the heat of a soldering-flame is avoided. The block having been secured in place on the backing-plate is laid over the facing to ascertain if the pins fit properly in the anchoring-block. If the facing and backing-plate are found to fit together properly, the backing is removed and a suitable solder material filled in upon each side of the block, concealing the corners of the same and forming a smooth rounded surface on the back of the plate, as shown in Fig. 5. The completed backing-plate is then placed over the facing and cemented thereon and the ends of the pins 3, projecting through the back 6, are bent in toward each other until they are flush with the rounded surface of the backing within the groove 8 in said block. The facing is thus rigidly secured to the backing-plate, and as the operation of clenching the ends of the pins tends to draw the cemented surfaces of the facing and backing-plate closer together it follows that a fluid-tight joint will be formed between the front and back portions of the tooth. The ends of the pins in the groove 8 are then covered and the groove filled in the usual manner by gold or composition filling. The tooth then presents the appearance shown in Fig. 9, and in this form is known among dentists as a "dummy." To form a bridge for a front tooth, a dummy of this kind may be used singly or in series, suitably secured together, as shown in Fig. 10.

In Fig. 11, 9 represents another form of anchoring-block adapted for use in constructing a bicuspid dummy. It is flat upon one side to bear upon the backing-plate 10, rounded upon the opposite side, and slightly tapered from top to bottom to conform to the shape of a bicuspid tooth. The block is provided with holes corresponding with those of the block 6; but instead of providing a groove between the holes wherein the ends of the pins are clenched I am able, owing to the shape of the bicuspid tooth, to make the blocks of sufficient thickness to permit the anchoring-pins to be secured therein without clenching. Various ways may be devised for securing the pins in the block 9; but I prefer after soldering the block on the backing-plate and smoothing the surface of said plate to fill the holes in the block with cement, so that when the facing is fitted into the box on the backing-plate the pins will enter the holes in the block and the cement hardening around them will lock the parts firmly together.

In Fig. 16 another form of anchoring-block 11 is shown, designed particularly for use in the construction of a Richmond crown, said block having a flat face to fit the backing-plate 12 and square ends and a rounded outer face to conform to the shape of the crown. 13 represents the grinding-plate for the crown, 14 the anchoring pins or posts that fit into sockets in the root, and 15 the band that fits over the top of the root. The crown is built up in the manner shown in Figs. 17 and 18, the anchoring-block being fitted to the backing-plate and secured thereon and its ends and surface covered with gold solder in the usual manner. The grinding-plate and the band 15 having been united to the backing, the facing is permanently secured within the box on the backing-plate by cementing together the surfaces of the facing and plate and embedding the pins within the holes in the block 11 in the manner already described.

In Fig. 15 I have shown an anchor-block 16 for a molar tooth, in which the block is similar to the one used for the bicuspid, the variation being for the purpose simply of adapting it to a different-shaped tooth.

It will be noted that in the construction of the dummy for the bicuspid or molar tooth and for the Richmond crown that the anchor-blocks are all secured in place on the backing-plate and the operation of soldering the parts entirely completed before the facing is secured and the tooth completed. All danger of injuring the facing by heat during the process of soldering is therefore avoided and the anchoring of the facing-pins by cementing them in the sockets of the blocks forms a more rigid joint between the parts than could possibly be obtained by the method usually employed, and as the anchoring-blocks take the place of a quantity of solder in which the pins are usually embedded it follows that a considerable saving in gold solder is effected.

Having thus described my invention, I claim as new and desire to secure by Letters Patent—

1. As a new article of manufacture, an artificial tooth, comprising a facing having locking or anchoring pins, a comparatively-thin backing-plate fitted over said facing and having holes to receive said pins, an anchoring-block provided on said backing and having holes registering with the holes therein, and wherein the ends of said pins are secured and a suitable fitting provided upon each side of said block, covering and concealing the edges of the same and forming a smooth and corners rounded surface on the rear of the tooth.

2. As a new article of manufacture, an artificial tooth, comprising a facing having locking or anchoring pins, a comparatively-thin backing-plate fitted over said facing and having holes to receive said pins, and an anchoring-block provided on said backing, and having holes registering with the holes in said backing and adapted to receive the ends of said pins and said block being provided with a groove connecting the holes therein and wherein the ends of said pins are clenched, substantially as described.

In testimony whereof I have hereunto set my hand this 5th day of February, 1900.

CHARLES S. TALBERT.

Witnesses:
 RICHARD PAUL,
 M. C. NOONAN.

It is hereby certified that in Letters Patent No. 658,193, granted September 18, 1900, upon the application of Charles S. Talbert, of Minneapolis, Minnesota, for an improvement in "Artificial Teeth," an error appears in the printed specification requiring correction, as follows: In line 97, page 2, the word "fitting" should read *filling;* and that the said Letters Patent should be read with this correction therein that the same may conform to the record of the case in the Patent Office.

Signed, countersigned, and sealed this 9th day of October, A. D., 1900.

[SEAL.]
                F. L. CAMPBELL,
                *Assistant Secretary of the Interior.*

Countersigned:
 C. H. DUELL,
  *Commissioner of Patents.*